United States Patent
Rantet et al.

(10) Patent No.: US 9,530,261 B2
(45) Date of Patent: Dec. 27, 2016

(54) METHOD AND DEVICE FOR TRIGGERING, USING AN RFID READER, A PROCEDURE FOR ACTUATING A MEANS FOR LOCKING/UNLOCKING THE ACCESS DOORS OF A MOTOR VEHICLE

(75) Inventors: Dominique Rantet, Beaumont-sur-Lèze (FR); Luc Jansseune, Venerque (FR); Yves Daviaud, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 407 days.

(21) Appl. No.: 14/237,194

(22) PCT Filed: Jul. 20, 2012

(86) PCT No.: PCT/EP2012/003083
§ 371 (c)(1),
(2), (4) Date: Mar. 27, 2014

(87) PCT Pub. No.: WO2013/020644
PCT Pub. Date: Feb. 14, 2013

(65) Prior Publication Data
US 2014/0232523 A1    Aug. 21, 2014

(30) Foreign Application Priority Data
Aug. 5, 2011  (FR) ...................... 11 02469

(51) Int. Cl.
*G07C 9/00* (2006.01)
*B60R 25/24* (2013.01)

(52) U.S. Cl.
CPC ........... *G07C 9/00111* (2013.01); *B60R 25/24* (2013.01)

(58) Field of Classification Search
CPC .. G07C 9/00007; G07C 9/00111; B60R 25/24
(Continued)

(56) References Cited

U.S. PATENT DOCUMENTS 6,281,599 B1 * 8/2001  Murakami .............. B60R 25/24
                                                                       180/287
7,796,965 B2    9/2010  Moser et al.
(Continued)

FOREIGN PATENT DOCUMENTS

CN  101151619  3/2008
CN  101473234  7/2009
(Continued)

OTHER PUBLICATIONS

International Search Report dated Sep. 5, 2012, corresponding to PCT/EP2012/003083.

*Primary Examiner* — Brian Wilson
(74) *Attorney, Agent, or Firm* — Young & Thompson

(57) ABSTRACT

A method and device for triggering, via an RFID reader (5) endowed with a transmitting antenna (6), a procedure for actuating an element for locking/unlocking the access doors (2) of a motor vehicle (1). A coil (7) is arranged in the vicinity and in the field of action of the transmitting antenna (6), and:
- the RFID reader (5) is commanded so as to control the successive transmission of electromagnetic pulses of the same power,
- upon each pulse, a value representative of the electrical voltage at the terminals of the coil (7) is measured,
- and the procedure for actuating the locking/unlocking element is triggered in the event of a variation in the measured values greater than a determined value.

15 Claims, 1 Drawing Sheet

Figure 1:
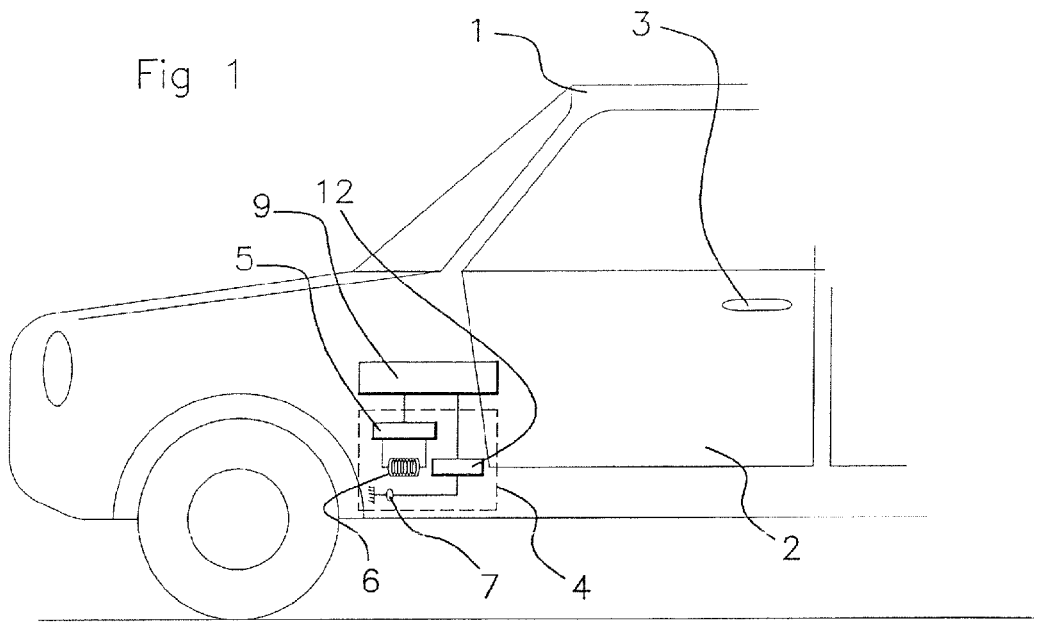

(58) Field of Classification Search
USPC ...... 340/10.1, 10.3, 5.1, 5.2, 5.64, 5.7, 5.71, 340/5.72
See application file for complete search history.

(56) References Cited

U.S. PATENT DOCUMENTS

| | | |
|---|---|---|
| 2007/0257770 A1 | 11/2007 | Moser et al. |
| 2008/0211635 A1 | 9/2008 | Rauber et al. |
| 2009/0251291 A1* | 10/2009 | Borcherding ...... G06K 7/10128 340/10.1 |

FOREIGN PATENT DOCUMENTS

| | | |
|---|---|---|
| DE | 102008023848 | 11/2009 |
| DE | 102008037376 A1 * | 3/2010 |
| JP | 10-329648 | 12/1998 |
| WO | 2006/106481 | 10/2006 |

* cited by examiner

METHOD AND DEVICE FOR TRIGGERING, USING AN RFID READER, A PROCEDURE FOR ACTUATING A MEANS FOR LOCKING/UNLOCKING THE ACCESS DOORS OF A MOTOR VEHICLE

The invention relates to a method and device for triggering, using an RFID reader endowed with a transmitting antenna, a procedure for actuating a means for locking the access doors of a motor vehicle.

The procedures for actuating the means for locking the access doors of automobile vehicles are systematically preceded by a prior step of triggering said procedures.

This is particularly the case when the vehicle is equipped with a hands-free access device, particularly including:
- a central on-board unit in the vehicle,
- transmission/reception means arranged in the vehicle and comprising, in particular, transmitting antennas arranged in the handles of the access doors of said vehicle,
- portable remote-control facilities incorporating transmission/reception means,
- and proximity sensors implanted in the handles of the access doors of said vehicle.

In particular, such hands-free access devices are suitable for implementing, in succession:
- an identification procedure consisting in controlling the periodic transmission, by the transmitting antennas, of an identification signal recognizable by the control facilities dedicated to the vehicle, programmed to transmit, in response, an identification signal in the direction of an on-board receiver in the vehicle,
- an actuation procedure consisting in controlling, after identification of a control facility, the unlocking of the means for locking the access doors of the vehicle, triggered upon the detection, by a proximity sensor, of the access of a user to a handle of one of the access doors.

The same is the case when the vehicle is equipped with an access device, particularly comprising:
- radiofrequency transponders, incorporating identification data dedicated to each vehicle and suitable for being activated by a radiofrequency signal,
- an on-board RFID reader in the vehicle, suitable for activating the transponders lying in its field of action, and for receiving identification data coming from these transponders.

Indeed, such access devices are designed to implement an actuation procedure triggered, after transmission by the RFID reader of an electromagnetic signal of a duration and a power suitable for activating radiofrequency transponders, by the reception, in return, of identification data dedicated to the vehicle.

This prior step of triggering the actuation procedures is also involved when the vehicle is equipped with a proximity sensor, implanted in the handle of an access door, intended for controlling forced locking of the access doors.

Indeed, the procedure for actuating the locking means is triggered by the activation of the proximity sensor, upon the access of a user to the handle in which said sensor is implanted.

Whatever the application being considered, the major drawback of the step of triggering the actuation procedure lies in the cost incurred by said step.

Indeed, referring to the applications described above by way of examples, and first of all in the context of a hands-free access device and that of forced locking, this triggering step requires the installation of proximity sensors, the production cost of which is relatively high.

The access devices equipped with RFID readers do not exhibit this drawback related to the cost of the hardware for implementing the triggering step. On the other hand, this triggering step leads to a non-negligible power consumption resulting from the obligation of periodically powering the RFID reader with a current of intensity suitable for allowing the transmission, by said RFID reader, of an electromagnetic signal of a duration and a power capable of activating radiofrequency transponders.

The present invention aims to alleviate these drawbacks and its main goal is the provision of a triggering method requiring implementation means with a low production cost, and low power consumption.

With this aim, the invention addresses a method for triggering, by means of an RFID reader endowed with a transmitting antenna, a procedure for actuating a means for locking/unlocking the access doors of a motor vehicle, characterized in that it consists in arranging a coil in the vicinity and in the field of action of the transmitting antenna, and:
- in commanding the RFID reader so as to control the successive transmission of electromagnetic pulses of the same power,
- in measuring, upon each pulse, a value representative of the electrical voltage at the terminals of the coil,
- and in triggering the procedure for actuating the locking/unlocking means in the event of a variation in the measured values greater than a determined value.

It should be noted that, in the present patent application, "RFID reader" is intended to mean a reader/recorder implementing the method of radio-identification denoted by the acronym RFID ("Radiofrequency IDentification") i.e. a reader/recorder composed of a circuit capable of transmitting electromagnetic energy via a transmitting antenna, and electronics for receiving and decoding information sent by radiofrequency transponders, also known by the name of RFID "tags", activated by the electromagnetic energy transmitted by said reader/recorder.

According to the invention, the triggering of an actuation procedure therefore requires a simple RFID reader, furthermore commanded so as to operate in a low power consumption mode for as long as the measured values do not undergo significant variations representative of the detection of a presence in the field of action of said RFID reader, justifying the triggering of an actuation procedure.

Consequently, this triggering method requires implementation means with a low production cost, and furthermore a very low power consumption.

By way of a first advantageous application, this triggering method can be implemented with a view to triggering an actuation procedure consisting, first of all, in identifying a radiofrequency transponder presented facing the RFID reader (conventionally plasticized RFID card (also denoted by the terms "label", "tag" etc.), mobile phone etc.), then, after identification, in controlling the unlocking of the means for locking the access doors.

According to the invention, the triggering method then consists:
- in analyzing the variations in the measured values so as to identify a variation representative of the absorption, by a radiofrequency transponder, of the electromagnetic energy transmitted by the RFID reader,
- and in triggering an actuation procedure consisting in controlling the transmission, by the RFID reader, of an electromagnetic signal of a duration and a power suitable for activating radiofrequency transponders.

By way of example, with the aim of illustrating the savings made in terms of power consumption, the average intensity of the supply current of an RFID reader commanded in accordance with the invention is in the order of a few tens of microamperes.

A current conventional triggering method according to which the RFID reader is commanded so as to periodically transmit electromagnetic signals of a duration and a power suitable for activating radiofrequency transponders, then, after identification of a transponder, for triggering an actuation procedure consisting in controlling the unlocking of the means for locking the access doors, itself leads to a power consumption in the order of a few milliamperes.

It should moreover be noted that according to this first advantageous application, the method according to the invention that is intended to identify radiofrequency transponders can be implemented on a vehicle also equipped with a hands-free access device suitable for identifying portable control facilities incorporating an LF receiver and an RF transmitter.

This association of two methods of identification of different designs implemented in parallel leads to one and the same vehicle being endowed with identification means of a plurality of types of "electronic keys".

By way of a second advantageous application, the triggering method according to the invention aims to attribute to the RFID reader a function of a proximity sensor, specifically intended to replace the proximity sensor of the current hands-free access systems.

With this aim, the method according to the invention consists advantageously:
  in arranging the RFID reader and the coil in a handle of the access door of the motor vehicle,
  in analyzing the variations in the measured values so as to identify a variation representative of the presence of a hand in proximity to the RFID reader,
  and in triggering an actuation procedure suitable for controlling the unlocking of the locking means of the access doors of the motor vehicle.

By way of a third advantageous application, the triggering method according to the invention aims to attribute to the RFID reader a function of proximity sensor intended to control the "forced" locking of the means for locking the access doors.

With this aim, the method according to the invention consists advantageously:
  in arranging the RFID reader and the coil in a handle of an access door of the motor vehicle,
  in analyzing the variations in the measured values so as to identify a variation representative of the presence of a hand in proximity to the RFID reader,
  and in triggering an actuation procedure suitable for controlling the locking of the means for locking the access doors of the motor vehicle.

According to this application, furthermore, the actuation procedure consists, at first, in identifying an "electronic key", then, after identification, in controlling the locking of the locking means.

It should moreover be noted that, according to this third advantageous application, the method according to the invention, which is intended for the forced locking of the access doors, can be implemented on a vehicle equipped with a hands-free access device including a proximity sensor incorporated in the handles, and suitable for identifying portable control facilities incorporating an LF receiver and an RF transmitter.

In this scenario, if the proximity sensor is activated before the RFID reader, or if these two elements are activated simultaneously, the procedure for accessing the vehicle is classed as priority, and the actuation procedure aiming to obtain a forced locking is eclipsed.

On the other hand, if, on the contrary, the capacitive sensor is activated after the triggering of the actuation procedure aiming to obtain a forced locking, this procedure is classed as priority.

Moreover, for the purposes of increasing the reliability of the triggering method according to the invention, a moving average of the measured values is advantageously computed with a view to determining variations in the measured values.

With a same goal of efficiency, a coil is advantageously used, each winding of which consists in a winding homothetic to the windings of the transmitting antenna of the RFID reader.

According to another advantageous implementation of the invention, the evolution of the phase shift between the signal representative of the current in the transmitting antenna of the RFID reader and the signal representative of the current in the coil is analysed, in such a way that, in the event of a variation in the electrical voltage at the terminals of said coil, it is possible to make the triggering of the procedure for actuating the locking means conditional on the concomitant detection of a variation in the value of said phase shift.

This verification has the goal of making the method according to the invention insensitive to possible magnetic disturbance produced by external electromagnetic sources.

The invention extends to a device for triggering a procedure for actuating a means for locking the access doors of a motor vehicle, comprising an RFID reader endowed with a transmitting antenna. According to the invention, this device furthermore includes:
  a coil positioned in the vicinity and in the field of action of the transmitting antenna of the RFID reader,
  and a central unit connected, on the one hand, to the coil so as to receive a signal representative of the electrical voltage between the terminals of said coil, and on the other hand, to the RFID reader, and programmed, on the one hand, for controlling the successive transmission, by said RFID reader, of electromagnetic pulses of the same power, and on the other hand, for measuring, upon each pulse, a value representative of the electrical voltage between the terminals of the coil, and for triggering the procedure for actuating the locking means in the event of a variation in the measured values greater than a determined value.

Moreover, an electrical resistance with a value suitable for producing an electrical connection exhibiting high impedance is advantageously interposed on the electrical connection between the coil and the central unit, with a view to creating a circuit of very high impedance not likely to absorb the electromagnetic energy transmitted by the RFID reader.

This triggering device furthermore comprises, advantageously, means for processing the signal representative of the electrical voltage at the terminals of the coil, comprising a current rectifier, filtering means including at least one capacitance, and a switch capable of being switched between a closed state and an open state after each measurement.

One such triggering device can notably be advantageously intended to allow access to a vehicle by identification of radiofrequency transponders, through the programming of the central unit suitable for triggering an actuation procedure consisting in controlling the transmission, by the RFID reader, of an electromagnetic signal of a duration and a power suitable for activating radiofrequency transponders.

Figure 2:
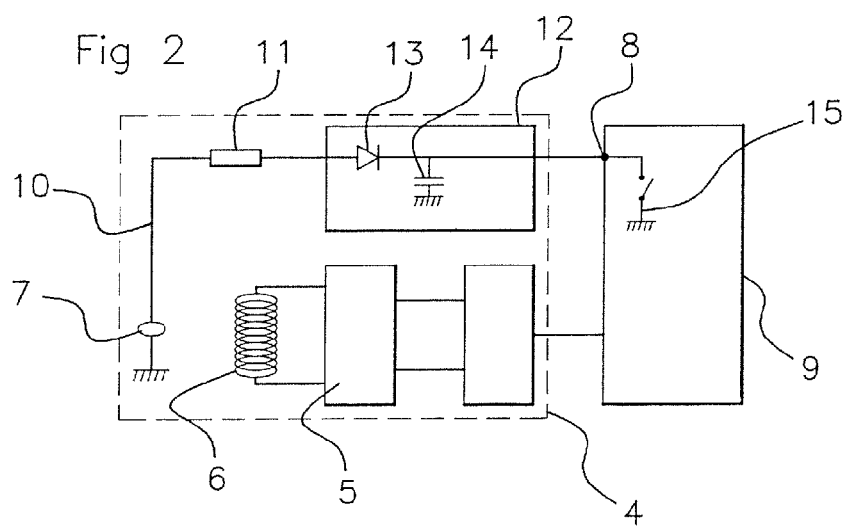
Figure 3:
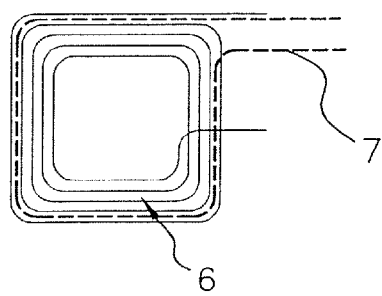

Other characteristics goals and advantages of the invention will appear from the following detailed description with reference to the appended drawings, which show by way of nonlimiting example a preferred embodiment. In these drawings:

FIG. 1 is a schematic view of a motor vehicle equipped with a triggering device according to the invention shown in the form of a block diagram, FIG. 2 is an electronic block diagram of this triggering device, and FIG. 3 is a schematic view of a transmitting antenna and a coil according to the invention.

FIG. 1 shows a vehicle 1 endowed with doors 2 fitted with handles 3 and equipped with a triggering device 4 controlled by an on-board central unit 9, and particularly intended to trigger a procedure for actuating the means for locking the doors suitable for identifying radiofrequency transponders, such as RFID cards, dedicated to the vehicle 1, and for controlling the unlocking after identification.

With this aim (see FIG. 2), this triggering device comprises, first of all, an RFID reader 5 endowed with a transmitting antenna 6.

According to the invention, this triggering device furthermore includes a coil 7 formed of one or two windings (in the example shown in the figures, a single winding) connected to an analog/digital input 8 of the central unit 9, by an electrical connection 10.

Additionally, as shown in FIG. 3, each winding (in the example the winding) of the coil 7 is intertwined with the windings of the transmitting antenna 6.

This triggering device moreover includes an electrical resistance 11 interposed on the electrical connection 10, and with a value suitable for forming a circuit of very high impedance not likely to absorb the electromagnetic energy transmitted by the RFID reader 5.

This triggering device furthermore includes means 12 for processing the signal representative of the electrical voltage at the terminals of the coil 7, comprising a diode 13 and filtering means including a capacitance 14.

Moreover, the central unit is programmed to present a switch function schematized at 15, capable of being switched between a closed state and an open state of discharge of the capacitance 14.

According to the invention, the central unit 9 is therefore connected, on the one hand, to the coil 7 so as to receive a signal representative of the electrical voltage at the terminals of said coil, and on the other hand, to the RFID reader 5, and this central unit 9 is programmed:

for controlling the successive transmission, by said RFID reader, of electromagnetic pulses of the same power, and for measuring, upon each pulse, a value representative of the electrical voltage at the terminals of the coil 7, and for triggering a procedure for actuating the locking means (not shown) in the event of a variation representative of the absorption, by a radiofrequency transponder (RFID card, mobile phone etc.), of the electromagnetic energy transmitted by the RFID reader 5.

Additionally, the actuating procedure consists in controlling the transmission, by the RFID reader 5, of an electromagnetic signal of a duration and a power suitable for activating radiofrequency transponders, then after identification, in controlling the unlocking of the means for locking the access doors 2.

In its mode of detection of the presence of a radiofrequency transponder in the vicinity of the RFID reader 5, the latter is therefore powered solely with a view to periodically transmitting electromagnetic pulses of the same power, and therefore operates in a mode of low power consumption.

The switching to an operating mode intended for the transmission, by the RFID reader 5, of an electromagnetic signal of a duration and a power suitable for activating radiofrequency transponders, is only involved after:

detection of a significant variation in the values representative of the electrical voltage at the terminals of the coil 7, measured after each pulse, the relevance of said variation being appraised on the basis of the computation of a moving average of the measured values, confirmation that the variation originates from the absorption, by an object such as a transponder presented in front of the reader RFID 5, of the energy transmitted by the latter, and not magnetic disturbances produced by external electromagnetic sources. This confirmation consists in analyzing the evolution of the phase shift between the signal representative of the current in the transmitting antenna 6 of the RFID reader 5 and the signal representative of the current in the coil 7, with a view to verifying that the variation in the electrical voltage at the terminals of the coil 7, is accompanied by a concomitant variation in the phase shift value.

Such a triggering method therefore makes it possible to appreciably reduce the power consumption of an RFID reader 5 used with a view to identifying radiofrequency transponders intended to allow access to a motor vehicle.

This goal is also achieved in the use of a triggering device according to the invention using RFID readers incorporated into the handles 3 of the doors 2 of motor vehicles 1, notably with a view to acting as a proximity sensor suitable for triggering a forced locking procedure, or a procedure for unlocking the means for locking said doors.

The invention claimed is:

1. A method for triggering, by means of an RFID reader (5) endowed with a transmitting antenna (6), a procedure for actuating a means for locking/unlocking access doors (2) of a motor vehicle (1), comprising arranging a coil (7) in a vicinity and in a field of action of the transmitting antenna (6), and:

in commanding the RFID reader (5) so as to control a successive transmission of electromagnetic pulses of the same power, in measuring, upon each pulse, a value representative of an electrical voltage at terminals of the coil (7), and in triggering the procedure for actuating the locking/unlocking means in the event of a variation in the measured values is greater than a determined value, wherein evolution of a phase shift between a signal representative of a current in the transmitting antenna (6) of the RFID reader (5) and a signal representative of a current in the coil (7) is analyzed, in such a way that, in the event the variation in the measured values is greater than the determined value, it is possible to make the triggering of the procedure for actuating the locking/unlocking means conditional on a concomitant detection of a variation in a value of said phase shift.

2. The triggering method as claimed in claim 1, wherein a moving average of the measured values is computed with a view to determining variations in the measured values.

3. The triggering method as claimed in claim 2, wherein the coil (7) is used, every winding of which consists in a winding that is homothetic to the windings of the transmitting antenna (6) of the RFID reader (5).

4. The triggering method as claimed in claim 2, wherein, variations in the measured values are analysed so as to identify a variation representative of absorption, by a radiofrequency transponder, of the electromagnetic pulses transmitted by the RFID reader (5),
and an actuation procedure is triggered consisting in controlling transmission, by the RFID reader (5), of an electromagnetic signal of a duration and a power suitable for activating the radiofrequency transponder.

5. The triggering method as claimed in claim 2, wherein, the RFID reader (5) and the coil (7) are arranged in a handle (3) of one of the access doors (2) of the motor vehicle (1),
variations in the measured values are analysed so as to identify a variation representative of a presence of a hand in proximity to the RFID reader (5),
and an actuation procedure is triggered consisting in controlling the unlocking of the means for locking/unlocking the access doors (2) of the motor vehicle (1).

6. The triggering method as claimed in claim 2, wherein, the RFID reader (5) and the coil (7) are arranged in a handle (3) of one of the access doors (2) of the motor vehicle (1),
variations in the measured values are analysed so as to identify a variation representative of a presence of a hand in proximity to the RFID reader (5),
and an actuation procedure is triggered consisting in controlling the locking of the means for locking/unlocking the access doors (2) of the motor vehicle (1).

7. The triggering method as claimed in claim 1, wherein the coil (7) is used, every winding of which consists in a winding that is homothetic to the windings of the transmitting antenna (6) of the RFID reader (5).

8. The triggering method as claimed in claim 1, wherein, variations in the measured values are analysed so as to identify a variation representative of absorption, by a radiofrequency transponder, of the electromagnetic pulses transmitted by the RFID reader (5),
and an actuation procedure is triggered consisting in controlling transmission, by the RFID reader (5), of an electromagnetic signal of a duration and a power suitable for activating the radiofrequency transponder.

9. The triggering method as claimed in claim 8, wherein the coil (7) is used, every winding of which consists in a winding that is homothetic to the windings of the transmitting antenna (6) of the RFID reader (5).

10. The triggering method as claimed in claim 1, wherein, the RFID reader (5) and the coil (7) are arranged in a handle (3) of one of the access doors (2) of the motor vehicle (1),
variations in the measured values are analysed so as to identify a variation representative of a presence of a hand in proximity to the RFID reader (5),
and an actuation procedure is triggered consisting in controlling the unlocking of the means for locking/unlocking the access doors (2) of the motor vehicle (1).

11. The triggering method as claimed in claim 1, wherein, the RFID reader (5) and the coil (7) are arranged in a handle (3) of one of the access doors (2) of the motor vehicle (1),
variations in the measured values are analysed so as to identify a variation representative of a presence of a hand in proximity to the RFID reader (5),
and an actuation procedure is triggered consisting in controlling the locking of the means for locking/unlocking the access doors (2) of the motor vehicle (1).

12. A device for triggering a procedure for actuating a means for locking/unlocking access doors (2) of a motor vehicle (1), comprising an RFID reader (5) endowed with a transmitting antenna (6), including:
a coil (7) positioned in a vicinity and in a field of action of the transmitting antenna (6) of the RFID reader (5),
and a central unit (9) connected, on the one hand, to the coil (7) so as to receive a signal representative of an electrical voltage between terminals of said coil, and on the other hand, to the RFID reader (5), and programmed, on the one hand, for controlling successive transmission, by said RFID reader, of electromagnetic pulses of the same power, and on the other hand, for measuring, upon each pulse, a value representative of the electrical voltage between the terminals of the coil (7), and for triggering the procedure for actuating the locking/unlocking means in the event of a variation in the measured values is greater than a determined value,
wherein evolution of a phase shift between a signal representative of a current in the transmitting antenna (6) of the RFID reader (5) and a signal representative of a current in the coil (7) is analyzed by the central unit (9), in such a way that, in the event the variation in the measured values is greater than the determined value, it is possible to make the triggering of the procedure for actuating the locking/unlocking means conditional on a concomitant detection of a variation in a value of said phase shift.

13. The triggering device as claimed in claim 12, further comprising an electrical resistance (11) interposed on an electrical connection (10) between the coil (7) and the central unit (9), with a value suitable for producing the electrical connection with a high impedance.

14. The triggering device as claimed in claim 13, further comprising means for processing the signal representative of the electrical voltage between the terminals of the coil (7), comprising a current rectifier (13), filtering means including at least one capacitance (14), and a switch (15) that is switchable between a closed state and an open state after each measurement.

15. The triggering device as claimed in claim 12, configured to allow access to the motor vehicle (1) by identification of radiofrequency transponders, wherein the central unit (9) is programmed for triggering an actuation procedure consisting in controlling transmission, by the RFID reader (5), of an electromagnetic signal of a duration and a power suitable for activating the radiofrequency transponders.

* * * * *